June 20, 1961 A. L. HALL 2,989,652

TIME DISCRIMINATOR

Filed Feb. 10, 1959

INVENTOR.
ALVIN L. HALL
BY J. L. Whittaker
ATTORNEY

United States Patent Office 2,989,652
Patented June 20, 1961

2,989,652

TIME DISCRIMINATOR

Alvin L. Hall, Lancaster, Calif., assignor to Radio Corporation of America, a corporation of Delaware Filed Feb. 10, 1959, Ser. No. 792,292
3 Claims. (Cl. 307—88.5)

The present invention relates to a new and improved circuit for sensing the time of occurrence of a pulse signal. The invention is particularly useful, for example, in radar automatic tracking circuits.

An object of the invention is to provide an improved time discriminator which is simple, cheap, compact, and light in weight, and which requires low power dissipation.

The invention includes a pair of normally open first switches connected in series between voltage sources of different value. A load circuit is connected to the junction of the two switches so that when one is closed, an output voltage of one value appears at the load circuit and when the other is closed, an output voltage of another value appears at the load circuit. Each first switch includes an input circuit to which a pulse may be applied for closing the switch. A pair of normally closed second switches are connected one in shunt across each input circuit. The second switches are opened in succession (by early and late gates). The pulse, the time of occurrence of which is to be sensed, is simultaneously applied to the input circuits to the first switches. If the pulse is coincident with a gate, it develops a voltage across an input circuit to a first switch, that switch conducts, and an output error voltage is applied to the load circuit.

In a preferred form of the invention, all of the switches mentioned above are transistors. The first transistors (switches) are connected with their emitter-to-collector circuits in series between positive and negative voltage sources and normally do not conduct. The transistors across the input circuits to the first transistors normally conduct but are driven to cut-off in succession by early and late gates. If a video pulse occurs at the same time as a gate, it causes a normally non-conducting first transistor to conduct and an output error voltage which is positive, negative, or zero to appear at the load circuit, depending upon the time of occurrence of the pulse with respect to the early and late gates.

Figure 1:
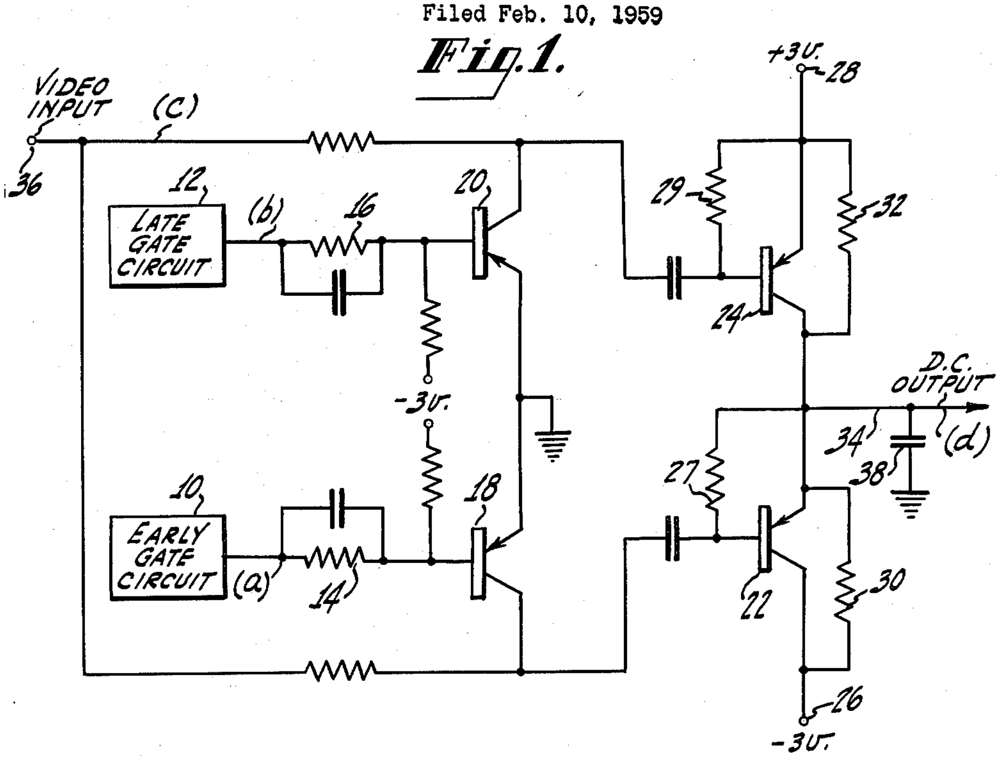
Figures 2A, 2B, 2C:
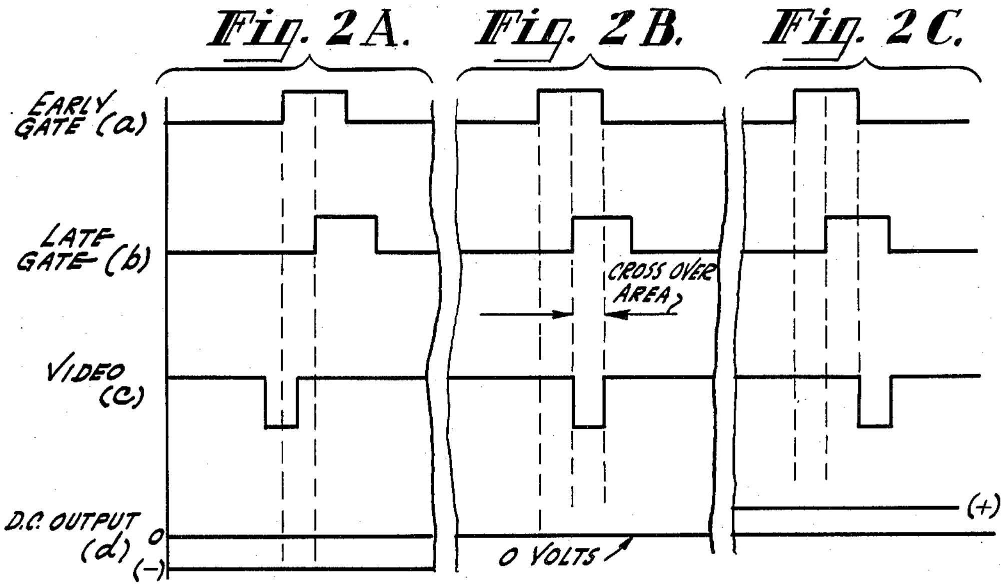

The invention will be described in greater detail by reference to the following description taken in connection with the accompanying drawing in which:

FIG. 1 is a block and schematic circuit diagram of a preferred form of the present invention; and FIGS. 2A–2C are drawings of waveforms to illustrate the operation of the circuit of FIG. 1.

The early and late gate circuits 10 and 12 produce gate pulses *a* and *b* as shown in FIGS. 2A–2C. These are applied through RC coupling circuits 14 and 16 to the bases of second switches, transistors 18 and 20. These transistors have —3 volts applied to their base biasing resistors so that they normally conduct in the saturation region. As can be seen in FIGS. 2A–2C, the applied gate pulses are of the correct sense to drive transistors 18 and 20 to cut-off during the gate intervals.

The first switches, transistors 22 and 24, are connected with their emitter-to-collector circuits in series between positive and negative voltage sources. This is indicated schematically by the notation —3 volts at terminal 26 and +3 volts at terminal 28. Transistors 22 and 24 are normally maintained cut-off by the bias applied to their bases through resistors 27 and 29. Resistors 30 and 32 are connected across the emitter-to-collector circuits of transistors 22 and 24, respectively. These resistors are of the same value so that the circuit is balanced—balanced in the sense that zero volt appears at output lead 34.

The input to the time discriminator consists of video pulses applied from terminal 36 to the collectors of transistors 18 and 20 and to the bases of transistors 22 and 24. The output circuit of the time discriminator includes a capacitor 38, the function of which is to integrate the voltage appearing at lead 34. As will be explained below, the integrated voltage is a D.C. voltage indicative of the displacement in time of the input video pulse from the cross-over area of the early and late gates.

In operation, normally conducting transistors 18 and 20 provide shunt, low impedance paths across the input circuits to transistors 22 and 24. Thus, if a video pulse should occur during the time transistors 18 and 20 are conducting, it produces no base current flow in transistors 22 and 24 and the latter transistors remain cut off. If, on the other hand, a video pulse occurs, for example, during the time transistor 20 is maintained cut off by the late gate *b*, it causes transistor 24 to conduct and there is a low impedance path between the +3 volt source and lead 34. Thus, the voltage divider 30, 32 is unbalanced and a voltage of close to +3 volts appears at lead *d*. The waveforms are shown in FIG. 2C.

It can readily be shown that if the video pulse occurs earlier in time so that during the video pulse interval transistor 18 is cut off whereas transistor 20 conducts, the D.C. output error voltage is almost —3 volts as is illustrated schematically in FIG. 2A. If, on the other hand, the early and late gates are properly centered on pulse *c*, both transistors 22 and 24 conduct during the video pulse interval and zero volts appears at lead 34. This is shown in FIG. 2B.

While not illustrated in the drawing, it is to be understood that the D.C. output error voltage at lead 34 is normally fed back to the early and late gate circuits in the proper sense to always maintain the early and late gates centered on the pulse. Circuits of the latter type are well known in the automatic radar tracking art.

In the circuit illustrated, the video pulse is applied to terminal 36. Instead, a gate pulse can be applied there and successive video pulses applied to the bases of transistors 18 and 20. The latter can be produced, for example, by applying a video pulse directly to the base of transistor 18 through a delay line to the base of transistor 20.

The principal advantages of the circuits described are their simplicity, light weight, and low power dissipation. The small amount of power dissipated in the form of heat has particular significance in airborne and missile applications where heat removal is a major problem.

What is claimed is:

1. In combination, a pair of normally non-conductive first transistors connected with their emitter-to-collector circuits in series between voltage sources of positive and negative values, the sources being connected to produce current flow through the transistors when the latter conduct; a load circuit connected to the connection which is common to the emitter of one transistor and the collector of the other; an input circuit connected to the base of each transistor, respectively, to which a pulse may be applied for causing the transistor to conduct; a pair of normally conducting second transistors, one connected in shunt across each of said input circuits; means for applying successive gate pulses to the second transistors in a sense to render them non-conductive in succession; and means for applying a video pulse to both of said input circuits in a sense to render the first transistors conductive.

2. Apparatus for effecting a time comparison of a succession of gate pulses and a succession of video pulses, one of said succession of pulses occurring in pairs of pulses in which one pulse immediately follows another, said apparatus comprising a pair of normally non-conductive first transistors connected with their emitter-to-collector circuits in series between voltage sources of positive and negative values, the sources being connected to produce current flow through the transistors when the latter conduct; a load circuit connected to the connection which is common to the emitter of one transistor and the collector of the other; an input circuit connected to the base of each transistor, respectively, to which a pulse may be applied for causing the transistor to conduct; a pair of normally conducting second transistors, one connected in shunt across each of said input circuits; means for applying one of said succession of pulses to the second transistors in a sense to render them non-conductive; and means for applying the other succession of pulses to both of said input circuits in a sense to render the first transistors conductive.

3. In combination, a pair of normally non-conductive first transistors connected with their emitter-to-collector circuits in series between voltage sources of positive and negative values, the sources being connected to produce current flow thorugh the transistors when the latter conduct; a load circuit connected to the connection which is common to the emitter of one transistor and the collector of the other; an input circuit connected to the base of each transistor, respectively, to which a pulse may be applied for causing the transistor to conduct; a pair of normally conducting second transistors, one connected in shunt across each of said input circuits; means for producing gate pulses, means for applying a succession of said gate pulses to the second transistors in a sense to render them non-conductive; and means for applying a succession of video pulses to both of said input circuits in a sense to render the first transistors conductive, one of said succession of pulses occurring in pairs of pulses in which one pulse immediately follows the other.

References Cited in the file of this patent

UNITED STATES PATENTS

| | | |
|---|---|---|
| 2,584,986 | Clark | Feb. 12, 1952 |
| 2,578,256 | MacNichol | Dec. 11, 1957 |
| 2,807,015 | Shank | Sept. 17, 1957 |
| 2,812,435 | Lyon | Nov. 5, 1957 |
| 2,872,582 | Norton | Feb. 3, 1959 |